United States Patent [19]
Koga

[11] Patent Number: 4,504,204
[45] Date of Patent: Mar. 12, 1985

[54] PIG FOR REPAIRING INTERIOR PORTIONS OF A PIPELINE

[75] Inventor: Motoyuki Koga, Tokyo, Japan

[73] Assignee: Hakko Co., Ltd., Tokyo, Japan

[21] Appl. No.: 552,657

[22] Filed: Nov. 17, 1983

[30] Foreign Application Priority Data

Nov. 19, 1982 [JP] Japan .................. 57-204377

[51] Int. Cl.³ .............................. B29D 23/08
[52] U.S. Cl. ........................... 425/11; 425/13
[58] Field of Search ............ 425/11, 13, 59, 62

[56] References Cited

U.S. PATENT DOCUMENTS

| | | | |
|---|---|---|---|
| 2,851,061 | 9/1958 | Bernard et al. | 425/13 X |
| 2,894,539 | 7/1959 | Cook et al. | 425/13 X |
| 3,091,013 | 5/1963 | Robinson | 425/59 |
| 4,181,484 | 1/1980 | Kostylev et al. | 425/59 |
| 4,370,113 | 1/1983 | Nakashin | 425/59 X |

Primary Examiner—J. Howard Flint, Jr.
Attorney, Agent, or Firm—Martin A. Farber

[57] ABSTRACT

A pig for repairing interior portions of a pipeline with resin. The pig has a cylindrical portion diameter of which is slightly smaller than the inner diameter of the pipeline so as to allow the moving of the pig in the pipeline.

A pair of introduction portions are formed by slanting rear portions of the cylindrical portion.

A pair of discharge grooves are axially formed in the cylindrical portion. The discharge grooves are overlapped with the introduction portions interposing periphery portions of the cylindrical portion and opened to the front of the cylindrical portion. Thus the resin in the rear side of the pig can be discharged to the front side passing through the periphery portions and discharge grooves.

5 Claims, 7 Drawing Figures

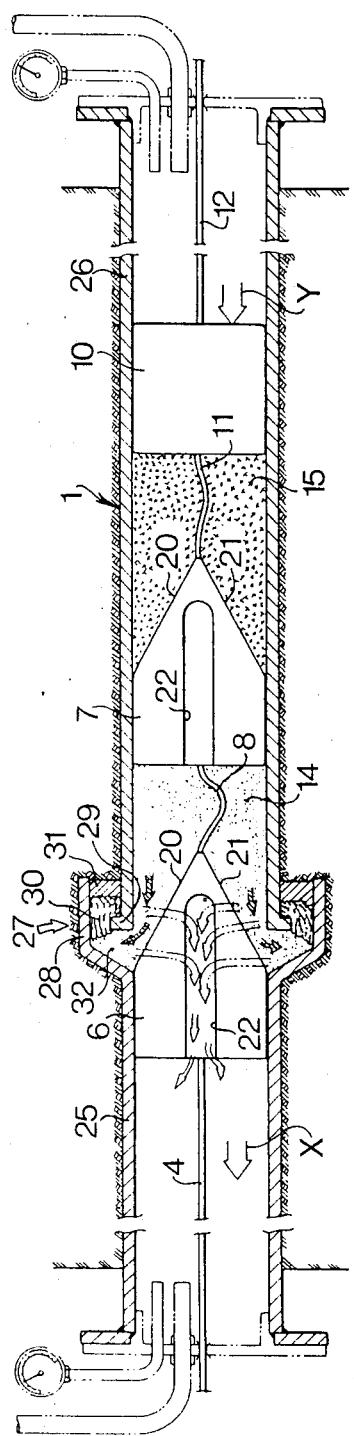
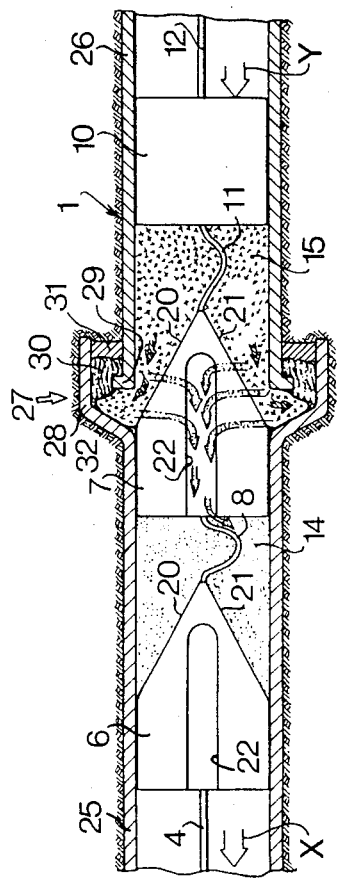
FIG. 2
FIG. 3

PIG FOR REPAIRING INTERIOR PORTIONS OF A PIPELINE

BACKGROUND OF THE INVENTION

The present invention relates to a pig for repairing interior portions of a pipeline comprising cast-iron pipes, and more particularly to a pig for repairing a sealing device in a joint of pipes of a pipeline such as a town gas pipeline or water pipeline. The quality of the sealing device of the gas pipeline deteriorates with laps of time, which causes leakage of gas from the pipeline. Therefore, it is necessary to repair the sealing device of old pipeline.

A method of repairing the sealing device of the joint of the gas pipeline with pigs has been proposed by the inventor. The method uses three pigs connected with each other by ropes at suitable distances. A first space between first and second pigs is filled with plastics having a low viscosity as a permeable material, and a second space between second and third pigs is filled with a puttying material. The pigs are moved in the pipeline passing through a joint. During the movement of pigs, the plastics permeates into a sealing member such as a gasket in a space of the joint, and then the puttying material is charged in a space between adjacent pipes, substituting for the plastics in the space. Thus, the joint is sealed by the puttying material.

In such a method, air in the sealing member must be substituted by the plastics pearmeated therein, and plastics remaining in the space between pipe ends must be substituted by the putting material.

SUMMARY OF THE INVENTION

The object of the present invention is to provide a pig which has a particular construction, so that effective substitutions of air with a plastics and of plastics with a puttying material can be performed.

According to the present invention there is provided a pig for repairing interior portions of a pipeline with resin comprising; a cylindrical portion diameter of which is slightly smaller than the inner diameter of the pipeline so as to allow the moving of the pig in the pipeline; at least one introduction portion which is formed by reducing a rear portion of said cylindrical portion; and at least one discharge passage formed in said cylindrical portion, said discharge passage being axially disposed and overlapped with said introduction portion interposing a periphery portion of said cylindrical portion and opened to the front of said cylindrical portion, whereby resin in the rear side of the pig can be discharged to the front side passing through the periphery portion and discharge passage.

The other objects and features of this invention will be apparently understood from the following description with reference to the accompanying drawings hereinafter.

BRIEF DESCRIPTION OF DRAWINGS

FIGS. 2 and 3 show steps of method of repairing of a pipeline; and

DETAILED DESCRIPTION OF THE PREFERRED EMBODIMENT

Figure 1:
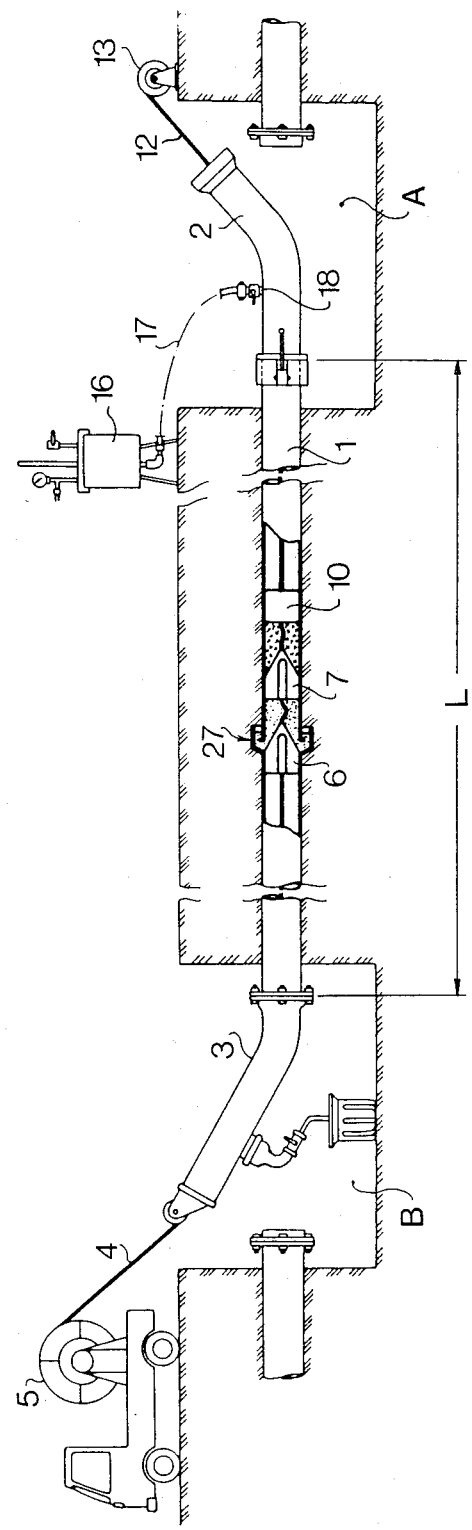
FIG. 1 shows a system for repairing a pipeline using pigs according to the present invention.

Referring to FIG. 1, an underground pipeline 1 comprising cast-iron pipes is separated into a length L (for example 100 m) suitable for repairing joints, and both ends of the pipeline are exposed in pits or access holes A, B. An inlet pipe 2 is connected to an end of the pipeline and an outlet pipe 3 is connected to the other end thereof. First, a leading wire (not shown) is inserted into the pipeline 1 from the inlet of the inlet pipe 2 and extracted from the outlet of the outlet pipe 3. Thereafter, an end of a tractive rope 4 is connected to the rear end of the leading wire, thereby to pass the rope 4 through the pipeline. The rope 4 is wound up by a winch 5.

As shown in FIG. 2, a first pig 6 is connected to the end of the rope 4. To the pig 6, a second pig 7 is connected by a rope 8 at a suitable space and a third pig 10 is connected to the second pig by a rope 11. The rope 12 connected to the third pig is wound on a reel 13. Each pig has a cylindrical portion diameter of which is slightly smaller than the inner diameter of the pipeline. The first space between pigs 6 and 7 is filled with a permeable material 14 of plastics having a low viscosity (400 cps–600 cps) such as epoxy resin and the second space between pigs 7 and 10 is filled with a putty material 15 of resin having a high viscosity (1,500 cps/18° C). These resins are supplied from a tank 16 through a pipe 17 and a nozzle 18 at the inlet pipe 2, when each space passes the nozzle 18.

Figure 4:
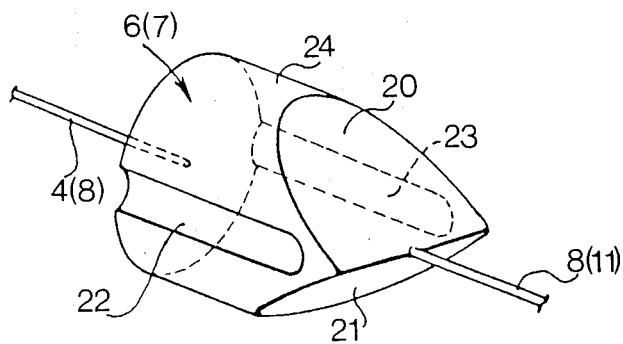
FIGS. 4 to 7 are perspective views showing various pigs according to the present invention.

Each pig is made of plastics, pigs 6, 7 are the same in shape and pig 10 is cylindrical. As shown in FIG. 4, the pig 6 (7) has a pair of radially reduced introduction portions 20 and 21 at a rear end portion, which are in forms of opposite slants. A pair of discharge grooves 22 and 23 are formed on the periphery of a cylindrical portion 24 of the pig. Both grooves are disposed in the axial direction on opposite portions and opened to the space in front of the pig. A rear portion of each groove is overlapped with the introduction portion interposing a periphery of the cylindrical portion 24.

As shown in FIG. 2, adjacent pipes 25 and 26 are connected with each other by a joint 27. The joint 27 comprises a socket 28 formed at the end of the pipe 25, having a larger diameter, a flange 29 formed on the end of the other pipe 26 and inserted in the socket 28, a sealing member 30 made of fibrous material, which is in the space between the socket 28 and the outer periphery of the pipe 26, and a cover 31 made of lead.

Pigs 6, 7 and 10 are moved by ropes 4, 8 and 11 in the direction X of FIG. 2. During the moving of the pigs, the space before the first pig 6 is maintained at a negative pressure (for example—0.5 kg/cm$^2$) by a vacuum pump (not shown). When the first pig 6 reaches the position shown in FIG. 2 where introduction portions 20 and 21 of the first pig 6 is at the joint 27, the pigs are stopped or slowed down. The position is detected by measuring the length of the extracted rope 4. At that time, compressed air is fed into the pipe 26 from the rear end opening thereof by a compressor (not shown) at a predetermined pressure (for example 0.5 kg/cm$^2$), so that the third pig 10 is forwards moved in the direction of the arrow Y. Thus, a pressure is applied to the permeable material 14 through putty material 15 and second pig 7, so that the permeable material is permeated into the sealing member 30 passing through introduction portions 20 and 21 and a space 32 between the socket 28 and the flange 29. Air or gas contained in the sealing member is extruded by the permeated material. The extruded air or gas passes the space 32, the periphery of the first pig 6, grooves 22 and 23 and is discharged into the pipe 25.

After the charging of the permeable material, pigs 6 and 7 are moved again and the space between the pigs is expanded, resulting in decrease of the pressure in the space. The grooves 22 and 23 are separated from the space by the periphery of the first pig 6. When the second pig 7 reaches the position of FIG. 3, pressure air applied on the third pig 10 compresses the putty material 15. Therefore, the putty material is charged in the space 32 and the permeable material in the space is discharged into the space between first and second pigs 6 and 7 passing through grooves 22 and 23 of the second pig 7. Thus, the space 32 is sealed by the putty material 15.

Figure 5:
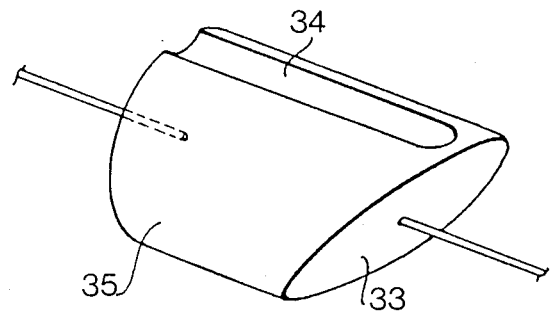

FIG. 5 shows another example of pig. The pig comprises a single introduction portion 33 in the form of down facing slant and a groove 34 formed in an upper periphery portion of a cylinder 35. The groove 34 extends to a portion adjacent to the end of the slant 33. Air extruded from the joint ascends along the periphery of the cylinder 35 and enters into the groove 34. Thus, air can be effectively discharged from the joint.

Figure 6:
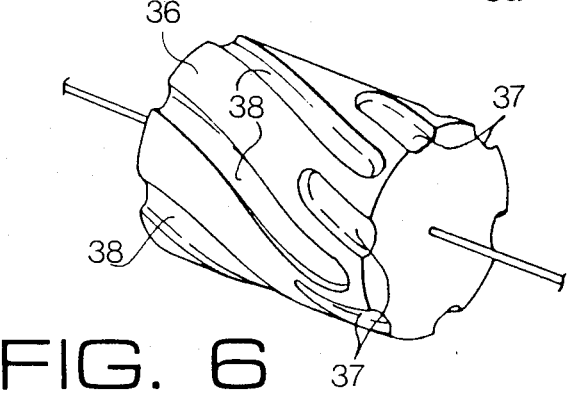

The pig of FIG. 6 has a cylindrical body 36 and no slant is provided. The pig comprises a plurality of helical first grooves 37 as introduction portions and second grooves 38 which are overlapped. The permeable material and putty material are supplied to the joint passing through the first grooves 37. Air and permeable material extruded from the joint are discharged passing through the second grooves 38.

Figure 7:
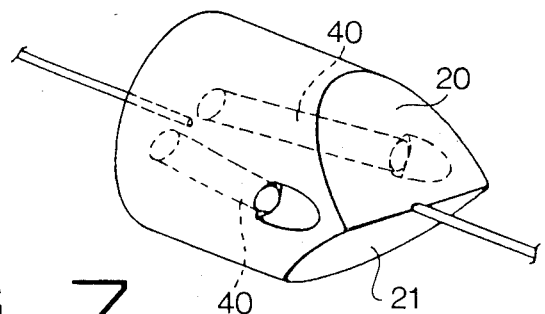

The pig shown in FIG. 7 has a pair of introduction portions 20 and 21 and a pair of discharge holes 40 instead of grooves. Each hole is opened at a peripheral portion which is overlapped with the introduction portions and opened at a front end of the pig.

While the presently referred embodiment of the present invention has been shown and described, it is to be understood that this disclosure is for the purpose of illustration and that various charges and modifications may be made without departing from the spirit and scope of the invention as set forth in the appended claim.

What is claimed is:

1. A pig for repairing interior portions of a pipeline with resin comprising;
    a cylindrical portion diameter of which is slightly smaller than the inner diameter of the pipeline so as to allow the moving of the pig in the pipeline;
    at least one introduction portion which is formed by reducing a rear portion of said cylindrical portion; and
    at least one discharge passage formed in said cylindrical portion, said discharge passage being axially disposed and overlapped with said introduction portion interposing a periphery portion of said cylindrical portion and opened to the front of said cylindrical portion, whereby resin in the rear side of the pig can be discharged to the front side passing through the periphery portion and discharge passage.

2. The pig according to claim 1 wherein said introduction portion is a slant.

3. The pig according to claim 1 wherein said introduction portion and discharge passage are helical grooves formed on the periphery of said cylindrical portion.

4. The pig according to claim 2 wherein said discharge passage is a groove formed on the periphery of said cylindrical portion.

5. The pig according to claim 2 wherein said discharge passage is a hole formed in the cylindrical portion, the front end of the hole is opened at a portion of said periphery portion and rear end is opened at the rear side of the cylindrical portion.

* * * * *